United States Patent Office 3,372,517
Patented Mar. 12, 1968

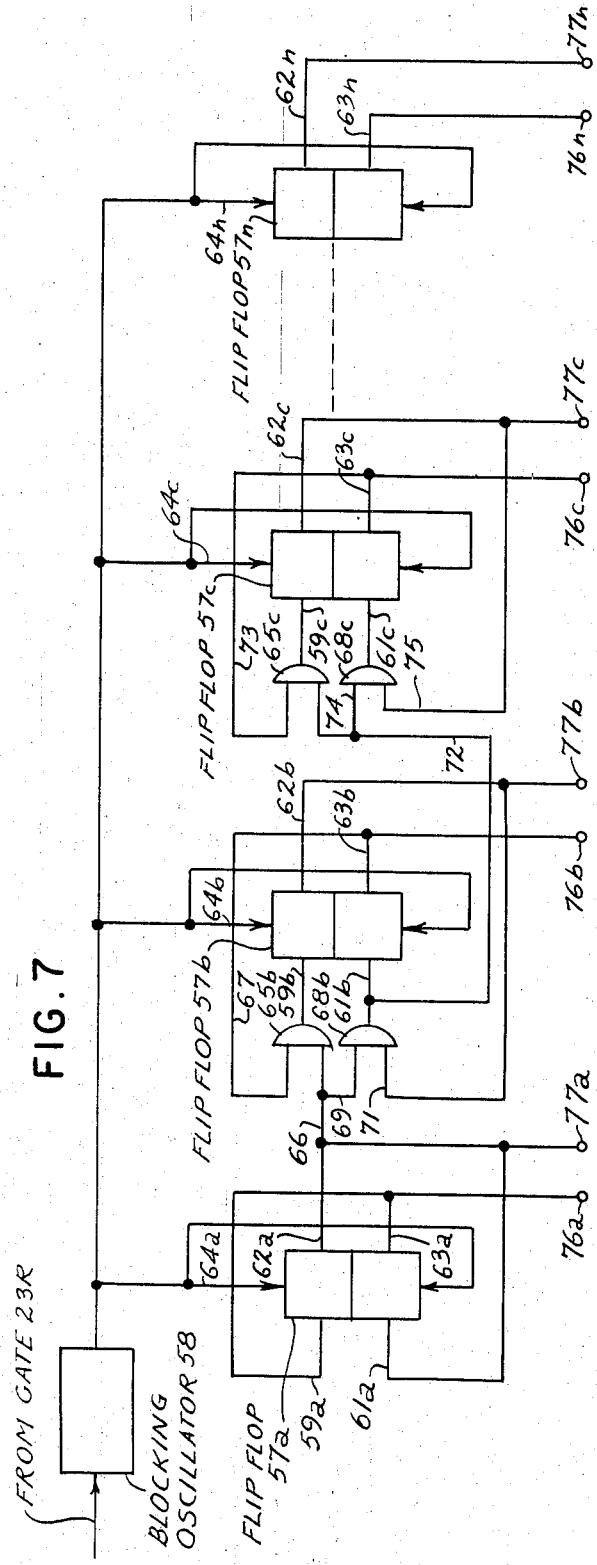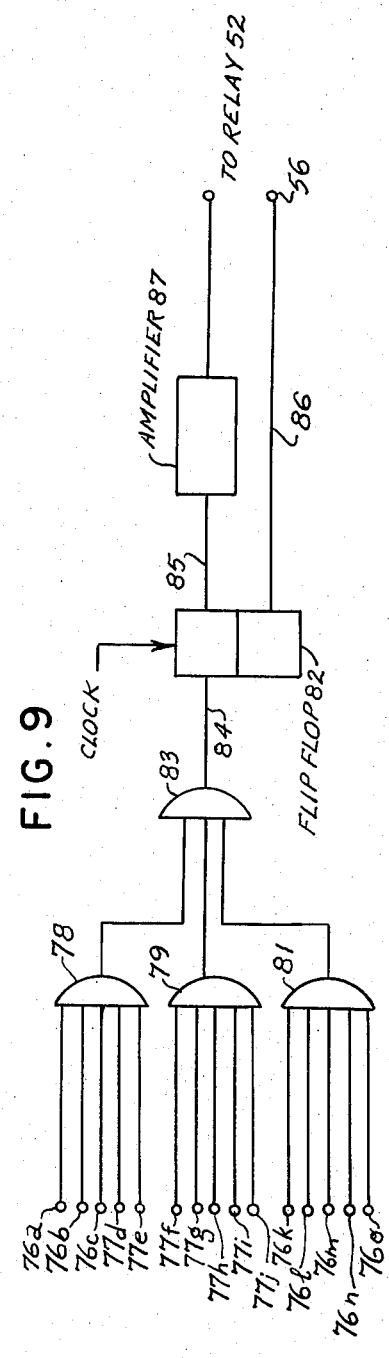

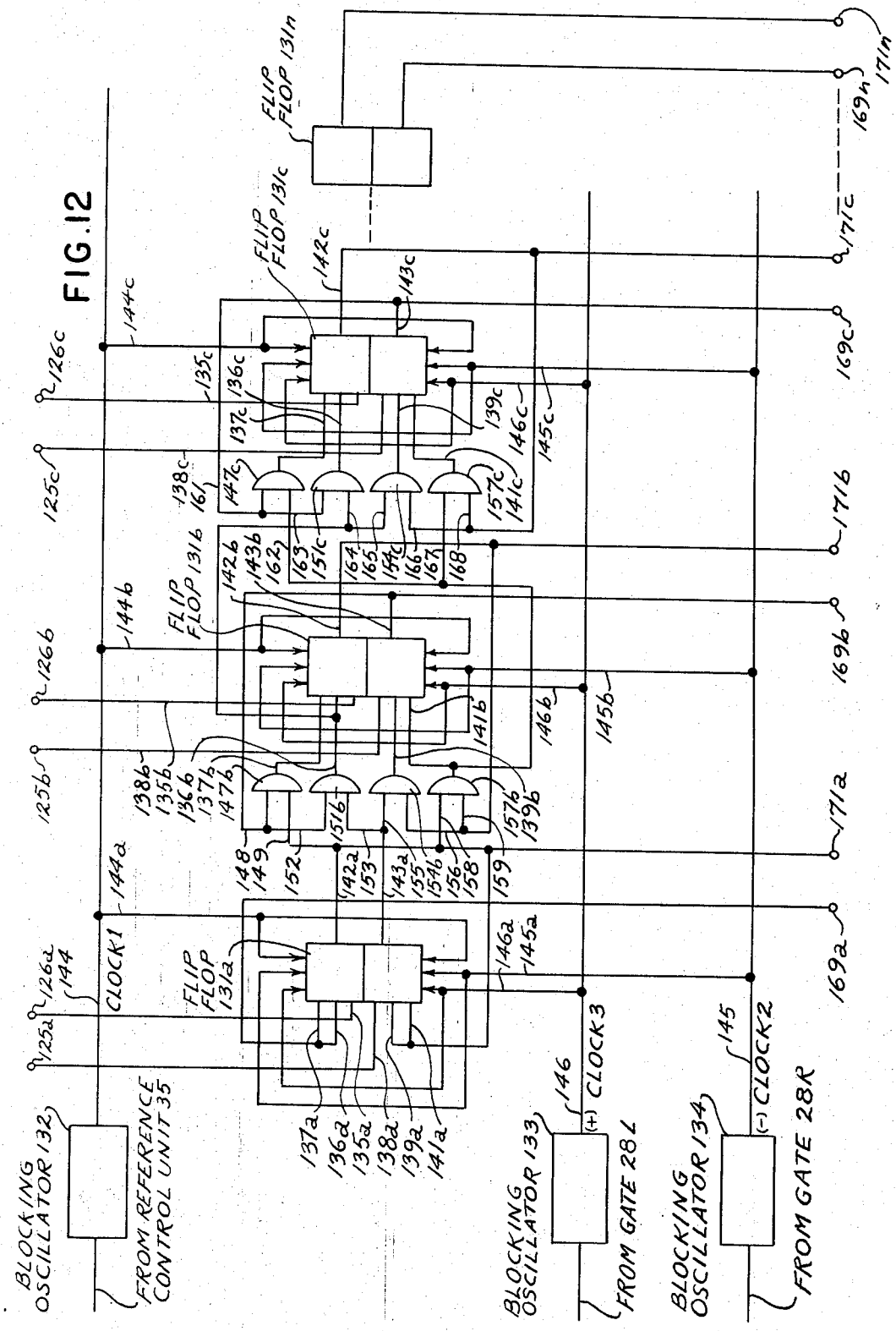

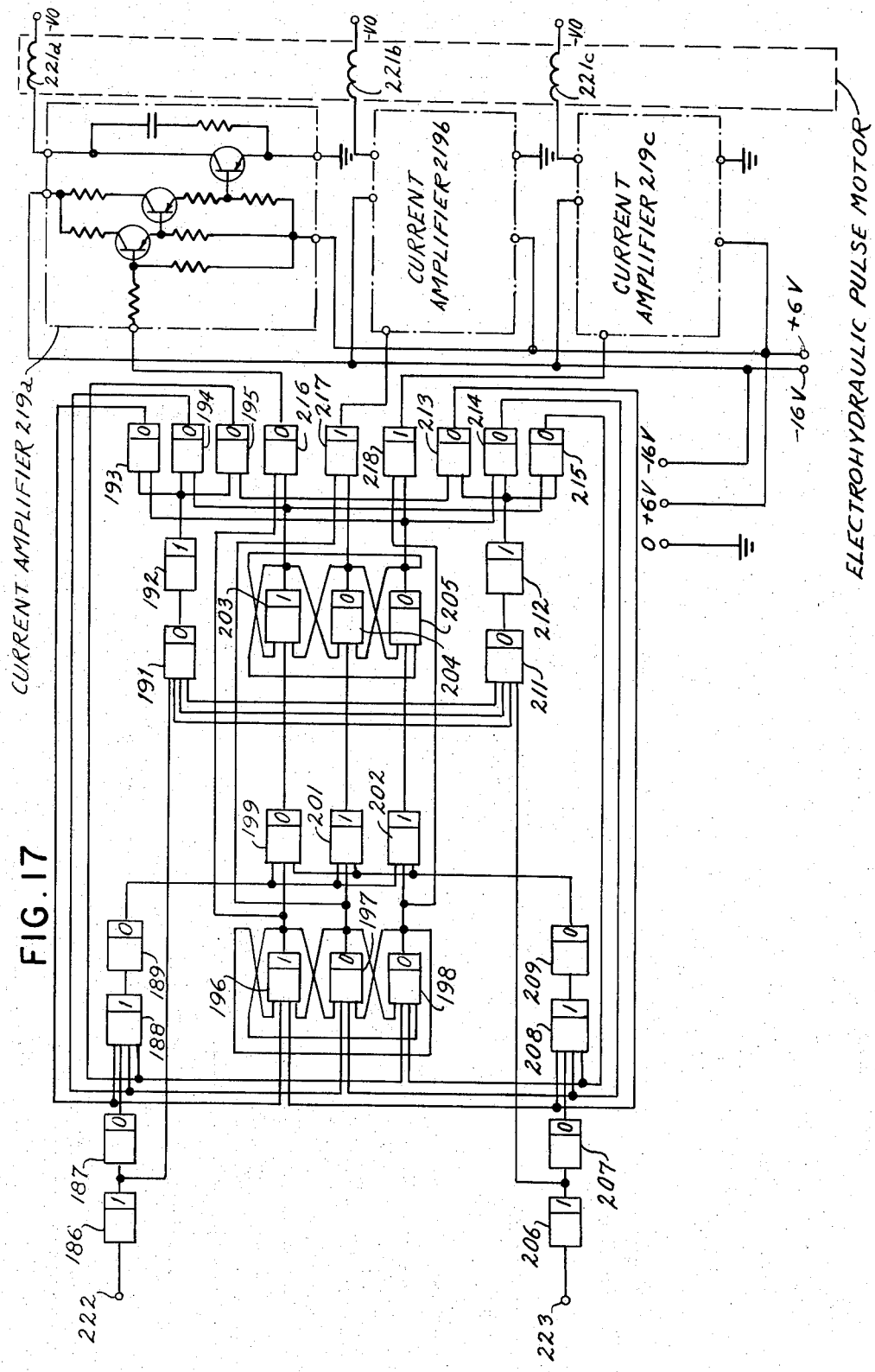

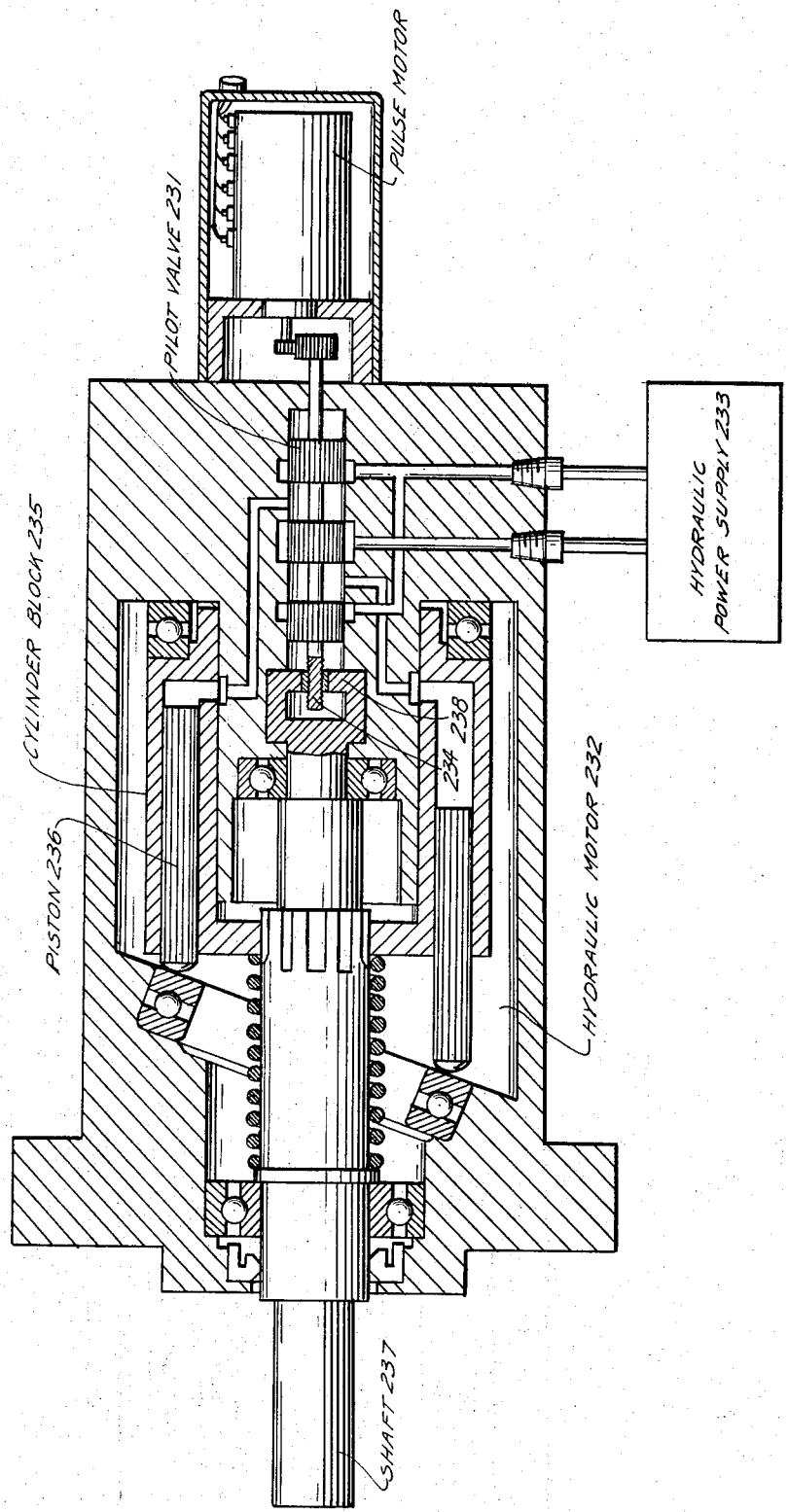

3,372,517
CONTROL SYSTEM FOR THE COMPARATIVE REGULATION OF THE DIAMETERS OF A PAIR OF WHEELS
Mitsugu Sakabe, Suita-shi, Hajime Shiomi, Osaka-fu, and Seiuemon Inaba, Kawasaki-shi, Japan, assignors of one-third each to Nippon Kokuyu Tetsudo (known in English as Japanese National Railways), Tokyo-to, Kaisha Seizo Kaisha, Ltd., Tokyo-to, a corporation of Japan, and Fujitsu Limited, Kawasaki, Japan, a corporation of Japan
Filed Dec. 29, 1965, Ser. No. 517,266
10 Claims. (Cl. 51—165)

The present invention relates to a control system for the comparative regulation of the diameters of a pair of wheels. More particularly, the invention relates to a control system for the comparative regulation of the diameters of a pair of wheels of a railway car.

The principal object of the present invention is to provide a new and improved control system for the comparative regulation of the diameters of a pair of wheels.

An object of the present invention is to provide a control system for the efficient, effective and reliable comparative regulation of the diameters of a pair of wheels.

Another object of the present invention is to provide a control system for the precise measurement of the diameters of a pair of wheels and the grinding down of the wheel of larger diameter until the diameters of both wheels are equal.

In accordance with the present invention, a control system for the comparative regulation of the diameter of a pair of wheels comprises a mount rotatably mounting first and second wheels, each of the wheels having a peripheral surface and a diameter. A first pulse producer positioned in operative proximity with the first wheel produces a first number of pulses corresponding to the diameter of the first wheel. A second pulse producer positioned in operative proximity with the second wheel produces a second number of pulses corresponding to the diameter of the second wheel. A comparator connected to the first and second pulse producers produces an output corresponding to the difference between the first and second number of pulses, the output having a polarity determined by which of the first and second wheels has the larger diameter and comprising a number of pulses. A first grinder grinds the peripheral surface of the first wheel. A second grinder grinds the peripheral surface of the second wheel. A pulse generator produces pulses for energizing the grinders. A control connected to the comparator, the first and second grinders and the pulse generator supplies pulses corresponding in number to the output of the comparator and produced by the pulse generator to one of the first and second grinders selected in accordance with the polarity of the output of the comparator.

In accordance with the present invention, the control system further comprises a first gate connected between the first pulse producer and the comparator. A second gate is connected between the second pulse producer and the comparator. Each of the first and second gates has a conductive condition in which it transfers pulses and a non-conductive condition in which it blocks pulses. A gate control connected to the gates switches the first and second gates to their non-conductive condition after the transfer through one of the first and second gates of a predetermined number of pulses thereby to block further transfer of pulses to the comparator.

The comparator comprises a reversible counter. Each of the first and second pulse producers comprises a measuring roller having a peripheral surface in proximity with the peripheral surface of the corresponding wheel, the roller being adapted to be rotatably driven by the corresponding wheel. A pulse generator coupled to the roller produces a number of pulses corresponding to the diameter of the corresponding wheel and a pulse shaper connected between the pulse generator and the comparator shapes the pulses produced by the pulse generator. Each of the first and second grinders comprises a grindstone. A support rotates and supports the grindstone. A motor coupled to the support positions the grindstone relative to the peripheral surface of the corresponding wheel, and a motor drive unit connected between the control and the motor energizes the motor with the pulses produced by the pulse generator.

In accordance with the present invention, the control comprises a preset counter connected to the comparator. A first gate is connected between the pulse generator and the preset counter and between the pulse generator and the first grinder. A second gate is connected between the pulse generator and the preset counter and between the pulse generator and the second grinder. Each of the first and second gates has a conductive condition in which it transfers pulses from the pulse generator to the corresponding grinder and to the preset counter and a non-conductive condition in which it blocks pulses. A sign detector is connected to the preset counter and to each of the first and second gates and controls the conductive condition of each of the gates in accordance with the polarity of the output of the comparator by switching one of the first and second gates to its conductive condition when the polarity is as determined, the preset counter switching the one of the first and second gates to its non-conductive condition via the sign detector when a number of pulses equal to the number of pulses in the output of the comparator is transferred by the one of the first and second gates.

In accordance with the present invention, the control system further comprises a switch and a gate time control connected to the switch and to the first and second gates, first-mentioned. The gate time control maintains the first and second gates, first-mentioned, in their non-conductive condition for a determined period of time after actuation of the switch and switches the first and second gates to their conductive condition after the expiration of the determined period of time.

In order that the present invention may be readily carried into effect, it will now be described with reference to the accompanying drawings, wherein:

FIG. 7 is a block diagram of an embodiment of the pulse counter 34 of the control system of FIG. 1;

FIG. 9 is a block diagram of an embodiment of the reference control unit 35 of the control system of FIG. 1;

FIG. 12 is a block diagram of an embodiment of the present counter 26 of the control system of FIG. 1;

FIG. 17 is a block diagram of an embodiment of the motor drive units 17R and 17L of the control system of FIG. 1;

FIG. 24 is a schematic diagram, partly in section, of an embodiment of the electrodynamic pulse motor 16R or 16L of the control system of FIG. 1;

Figure 1:
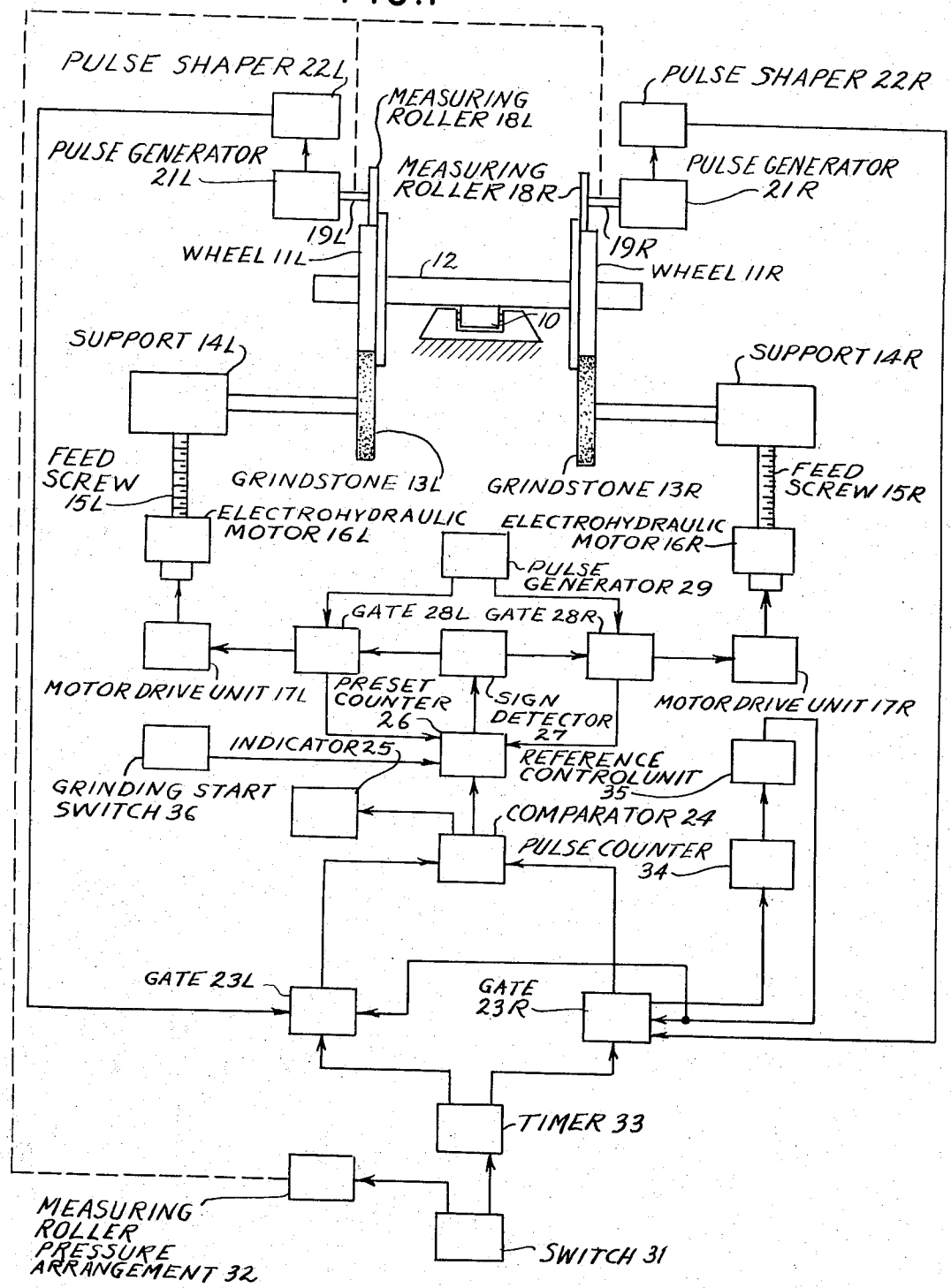
FIG. 1 is a block diagram of an embodiment of the control system of the present invention.

The control system of the present invention, as shown in FIG. 1, comparatively regulates the diameters of a pair of wheels of a railway car. The wheels may be affixed to the same shaft, but need not be. The control system measures the diameter of each of the pair of wheels by frictional rotation of a measuring roller on the peripheral rim of each wheel. The measuring roller is driven by the wheel and rotates through an angle corresponding to the circumference or rim length of the wheel. The wheel having the larger diameter is then ground down along its peripheral rim until the diameters of both wheels are equal.

A difference in diameter of a pair of wheels on a shaft of a railway car seriously affects the motion and vibration of the car as well as the abrasion of the wheels when the care is operated at high speed. Proper maintenance of the car and the wheels requires the control of the diameters of each pair of wheels to minimize any difference in the diameters of the wheels of each pair of wheels. The peripheral rim, which is the surface of the wheel which contacts the rail, is generally slightly tapered in an axial direction of the shaft. It is thus very difficult to properly measure the diameter of the wheel at a standard measuring position. The control system of the persent invention successively measures the difference in diameter of the wheels of the pair of wheels to provide precision results.

In FIG. 1, a pair of wheels 11R and 11L are mounted on a shaft 12 for rotation therewith. The wheels 11R and 11L are assumed to be those of a railway car and the wheel 11R is assumed to be the wheel on the right and the wheel 11L is assumed to be that on the left. The shaft 12 is supported by any suitable mechanism 10 which supports for rotation and rotates the shaft 12 and the wheels 11R and 11L with it. A grindstone 13R is positioned in proximity with the wheel 11R so that it may be brought into grinding abutment with the peripheral rim surface of said wheel when desired. A grindstone 13L is positioned in proximity with the wheel 11L so that it may be brought into grinding abutment with the peripheral rim surface of said wheel when desired.

The grindstone 13R is rotatably mounted on a support 14R which is movable in a direction which brings the grindstone 13R into or out of abutment with the peripheral surface rim of the wheel 11R by a feed screw arrangement 15R. The grindstone 13L is rotatably mounted on a support 14L which is movable in a direction which brings the grindstone 13L into or out of abutment with the peripheral surface rim of the wheel 11L by a feed screw arrangement 15L. The feed screw arrangement 15R is turned about its axis by an electrohydraulic motor 16R which is operated or energized by a motor drive unit 17R. The motor drive unit 17R supplies electrical pulses to the motor 16R and each of such pulses operates the motor to rotate through a determined minute angle thereby to turn the feed screw arrangement 15R through said determined minute angle. The feed screw arrangement 15L is turned about its axis by an electrohydraulic motor 16L which is operated or energized by a motor drive unit 17L. The motor drive unit 17L supplies electrical pulses to the motor 16L and each of such pulses operates the motor to rotate through a determined minute angle thereby to turn the feed screw arrangement 15L through said determined minute angle.

A measuring roller 18R is rotatably mounted on a shaft 19R which is rotated about its axis. The shaft 19R is movable in axial directions so that the measuring roller 18R may be positioned at different points on the peripheral surface of the wheel 11R in directions parallel to the axis of the shafts 12 and 19R. The peripheral surface of the measuring roller 18R is urged at a constant pressure against the peripheral surface of the wheel 11R by any suitable means such as, for example, mechanical pressure, magnetic force, oil pressure or air pressure, while it is rotated with its shaft 19R. A measuring roller 18L is rotatably mounted on a shaft 19L which is rotated about its axis. The shaft 19L is movable in axial directions so that the measuring roller 18L may be positioned at different points on the peripheral surface of the wheel 11L in directions parallel to the axis of the shafts 12 and 19L. The peripheral surface of the measuring roller 18L is urged at a constant pressure against the peripheral surface of the wheel 11L by any suitable means such as, for example, mechanical pressure, magnetic force, oil pressure or air pressure, while it is rotated with its shaft 19L.

The shaft 19R is coupled to and rotates with a pulse generator 21R which rotates with the measuring roller 18R and produces electrical pulses corresponding in number to the circumference or length of the peripheral surface of the wheel 11R. The electrical pulses produced by the pulse generator 21R are supplied to a pulse shaper 22R which shapes and amplifies such pulses so that they may be more readily counted. The shaft 19L is coupled to and rotates with a pulse generator 21L which rotates with the measuring roller 18L and produces electrical pulses corresponding in number to the circumference or length of the peripheral surface of the wheel 11L. The electrical pulses produced by the pulse generator 21L are supplied to a pulse shaper 22L which shapes and amplifies such pulses so that they may be more readily counted.

The pulses shaped by the pulse shaper 22R are supplied to a signal input of a gate 23R and, if transferred by said gate, are supplied to a comparator or pulse difference indicator 24 via signal output of said gate. The pulses shaped by the pulse shaper 22L are supplied to a signal input of a gate 23L and, if transferred by said gate, are supplied to the comparator or pulse difference indicator 24 via a signal output of said gate. The gate 23R controls the supply of pulses from the pulse shaper 22R to the comparator 24 to a determined period of time by control signals supplied to a control input of said gate.

The gate 23L controls the supply of pulses from the pulse shaper 22L to the comparator 24 to a determined period of time by control signals supplied to a control input of said gate.

The comparator 24 compares the number of pulses produced by the pulse generator 21R and shaped by the pulse-shaper 22R with the number of pulses produced by the pulse generator 21L and shaped by the pulse shaper 22L during the determined period of time that such pulses are transferred by the gates 23R and 23L, respectively. The output pulses produced by the comparator 24 thus correspond in number to the difference in circumference and therefore to the difference in diameter of the wheels 11R and 11L. This is due to the fact that circumference is $\pi d$, so that diameter is proportioned to circumference in diameter of the wheels 11R and 11L is either indicated visually or recorded by an indicator 25 connected to the comparator 24.

The output pulses produced by the comparator 24, which correspond to the difference in diameter of the wheels 11R and 11L, are supplied to a preset counter 26 which stores such output pulses and applies the number of such output pulses as a control for the extent of the grinding operation required to decrease the larger diameter to the magnitude of the smaller diameter. A sign detector 27 is connected to the preset counter 26 and determines what the sign of the diameter difference output pulses is. If the diameter difference signal produced by the comparator 24 is positive, the sign detector 27 supplies a control signal to the control input of one of gates 28R and 28L to make such gate conductive so that said gate conducts pulses supplied to its signal input from a pulse generator 29 to the corresponding one of the motor drive units 17R and 17L. If the diameter difference signal produced by the comparator 24 is negative, the sign detector 27 supplies a control signal to the control input of the other of the gates 28R and 28L to make such other gate conductive so that said other gate conducts pulses supplied to its signal input from the pulse generator 29 to the corresponding one of the motor drive units 17R and 17L. The pulses produced by the pulse generator 29 operate the motor drive unit 17R or 17L to which they are supplied.

A switch 31 is provided to start the measurement operation. When the switch 31 is operated or closed, either manually or by suitable mechanism, it actuates a measuring roller pressure arrangement 32 which applies pressure to the measuring rollers 18R and 18L so that the peripheral surfaces of said rollers and the corresponding wheels 11R and 11L abut under pressure as said measuring rollers rotate. The measuring roller pressure arrangement 32 may comprise any suitable arrangement for applying mechanical or magnetic force or hydraulic, air or other pressure to the measuring rollers 18R and 18L. The operation of the switch 31 also actuates a timer 33. The timer 33 provides outputs to the control inputs of both gates 23R and 23L to maintain said gates in their non-conductive condition until the expiration of a period of time sufficient to permit the measuring rollers 18R and 18L to come up to speed so that the pulses produced by both pulse generators 21R and 21L are counted from the same instant.

A pulse counter 34 is connected to a signal output of the gate 23R and counts the number of pulses produced by the pulse generator 21R corresponding to the diameter of the right wheel 11R. A reference control unit 35 is connected between the pulse counter 34 and a control input of the gate 23R and a control input of the gate 23L. The reference control unit 35 functions to control the operation of the gates 23R and 23L after they are initially made conductive by the timer 33, after the initial delay instituted by said timer. In operation, the timer 33 switches the gates 23R and 23L to their conductive condition and the reference control unit 35 switches said gates to their non-conductive condition. A grinding start switch 36 is connected to the preset counter 26 and functions to institute the corrective grinding operation.

The control system of the present invention operates to first grind the peripheral surfaces of the wheels 11R and 11L roughly, to then measure the differences in diameter of the wheels 11R and 11L, and to then grind down the peripheral surface of the wheel having the larger diameter of the two until both wheels have the same diameter. The measuring rollers 18R and 18L are spaced from the corresponding wheels 11R and 11L so that the rollers and wheels are not in contact during the rough grinding of said wheels. The wheels 11R and 11L are rotated by rotation of the shaft 12.

After rough grinding of the wheels 11R and 11L, the switch 31 is actuated and actuates the measuring roller pressure arrangement to urge the measuring rollers 18R and 18L against the corresponding wheels 11R and 11L, so that the peripheral surfaces of the wheel 11R and the measuring roller 18R are in abutment and the measuring roller 18R is rotated by the rotating wheel 11R, and the peripheral surfaces of the wheel 11L and the measuring roller 18L are in abutment and the measuring roller 18L is rotated by the rotating wheel 11L. The switch 31 also actuates the timer 33, which delays action for a period of time sufficient to enable the measuring rollers 18R and 18L to reach their operating speed and then switches the gates 23R and 23L to their conductive condition.

When the measuring rollers 18R and 18L are brought into contact with the corresponding wheels 11R and 11L, the corresponding pulse generators 21R and 21L produce pulses corresponding in number to the diameters of the wheels 11R and 11L, and such pulses are shaped by the corresponding pulse shapers 22R and 22L and are transferred by the corresponding gates 23R and 23L to the comparator 24. The comparator 24 produces output pulses corresponding in number to the difference in the numbers of pulses produced by the pulse generators 21R and 21L and thus to the difference in diameter between the wheels 11R and 11L. The difference in diameter of the wheels 11R and 11L is indicated by the indicator 25.

Simultaneously with the measurement and indication of the difference in diameter of the wheels 11R and 11L, the pulses produced by the pulse generator 21R, corresponding in number to the diameter of the wheel 11R, are counted by the pulse counter 34. When the number of pulses produced by the pulse generator 21R, as counted by the pulse counter 34 reaches a determined magnitude, previously set in the reference control unit 35, said reference control unit switches the gates 23R and 23L to their non-conductive condition.. The output of the comparator 24 at the instant that the gates 23R and 23L are made non-conductive is thus taken as the final measurement indication. The sign or polarity of the output of the comparator 24 indicates whether the diameter of the wheel 11R is larger or smaller than the diameter of the wheel 11L; the number of pulses of such output corresponding to the difference in diameter of the wheels.

The magnitude previously set in the reference control unit 35 is equal to the number of pulses which would be produced when a measuring roller rolls over a distance equal to twice the circumference of a wheel having a diameter which is the average of the maximum and minimum diameters desired. The number of pulses supplied to the comparator 24 from the pulse generator 21R is thus approximately equal to the number of pulses corresponding to two revolutions of the wheel 11R, so that the number of output pulses of the comparator 24 is proportional to the difference in diameter of the wheels 11R and 11L. The magnitude previously set in the reference control unit 35 may be equal to the number of pulses corresponding to any suitable number of circumferences of the wheel. The output of the comparator 24 is supplied to the preset counter 26 of the termination of the measurement operation; the measurement operation being terminated by the switching of the gates 23R and 23L to their non-conductive condition.

After the measurement operation is terminated, the grinding operation is instituted by actuation of the grinding start switch 36 either manually or by suitable mechanism. Actuation or operation of the grinding start switch 36 causes the preset counter 26 to supply its output to the sign detector 27 which in turn switches one of the gates 28R and 28L to its conductive condition and maintains the other of said gates in its non-conductive condition. The gate 28R or 28L which is thus made conductive transfers pulses produced by the pulse generator 29 to the corresponding motor drive unit 17R or 17L and the gate 28R or 28L which is non-conductive blocks pulses produced by said pulse generator from the corresponding motor drive unit. When the motor drive unit 17R or 17L receives pulses from the pulse generator 29, it energizes the corresponding electrohydraulic motor 16R or 16L to move the corresponding support 14R or 14L into grinding position and to grind the peripheral surface of the corresponding wheel 11R or 11L with the corresponding grindstone 13R or 13L.

Thus, for example, if the diameter of the wheel 11L is greater than the diameter of the wheel 11R, the sign detector 27 switches the gate 28L to its conductive condition so that pulses produced by the pulse generator 29 are supplied to the motor drive unit 17L and the wheel 11L is ground by the grindstone 13L. The pulses supplied to the motor drive unit 17L are also supplied simultaneously to the preset counter 26. The sign detector 27 maintains the gate 28R in its non-conductive condition. The pulses supplied to the motor drive unit 17L, which are simultaneously supplied to the preset counter 26, are counted by said preset counter and when the number of such pulses equals the number of pulses of the output of the comparator 24, which were supplied to said preset counter, the said preset counter registers zero and the sign detector 27 switches the gate 28L to its non-conductive condition. This terminates the grinding operation by blocking the supply of pulses to the motor drive unit 17L, thereby deenergizing the electrohydraulic motor 16L.

The pitch of each feed screw 15R and 15L is so determined that the output pulses of the comparator 24, which correspond in number to the difference in diameter between the wheels 11R and 11L, turn the corresponding one of said feed screws sufficiently, via the corresponding motor drive unit and the corresponding electrohydraulic motor, to grind down the wheel of larger diameter until the diameters of both wheels are equal. The abrasion and wearing of the peripheral surface of the grindstones during the grinding operation is taken into consideration, thereby enhancing the precision of operation of the system, by repeating the measuring and grinding operation and by grinding down the wheel of larger diameter, whichever it is, during the second grinding operation. Repetition of the measuring and grinding operations two or more times enhances the precision of operation by providing more precise equality of the diameters of both wheels. The measuring and grinding operations may be repeated continuously until the diameters of both wheels 11R and 11L are exactly equal. The alternation of the measuring and grinding operations compensates for abrasion of the peripheral surfaces of the grindstones.

The grindstones 13R and 13L operate independently from each other. After the comparator 24 determines the difference in diameter of the wheels and the signals indicating or corresponding to such difference are preset in the preset counter 26, during the grinding operation, the pulses corresponding to the diameters of the next pair of wheels to be regulated may be supplied to the comparator 24. The difference in diameter of two wheels may be accurately measured and accurately eliminated whether the wheels are on the same or different shafts.

Figure 2:
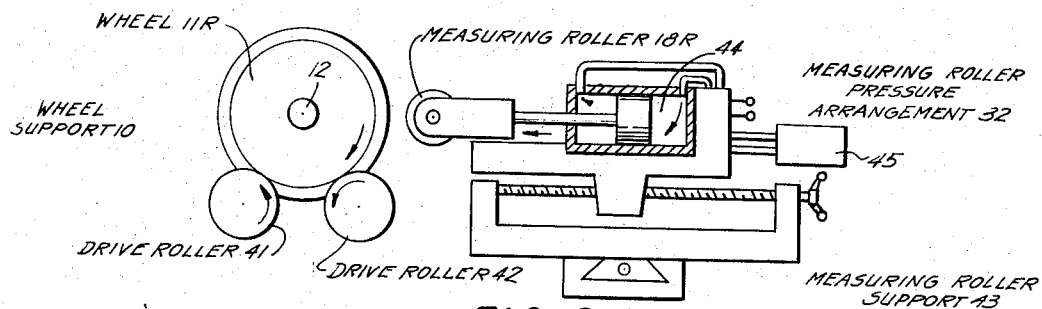
FIG. 2 is a schematic diagram of an embodiment of a mechanism for supporting a pair of wheels ad a mechanism for measuring the diameter of the wheels of the control system of FIG. 1.

FIG. 2 shows a mechanism 10 for supporting a pair of wheels and a mechanism for undertaking the diameter measuring operation. The wheel supporting mechanism 10 comprises a pair of spaced drive rollers 41 and 42 rotated in opposite directions and in abutment with the peripheral surface of one or both wheels. The drive rollers 41 and 42 are rotated at constant speed and cause rotation of the wheels at constant speed. The diameter measuring mechanism comprises a measuring roller support 43 and the measuring roller pressure arrangement 32. The measuring roller support 43 supports the measuring roller 18R for movement toward and away from the wheel 11R so that the peripheral surfaces of said measuring roller and said wheel may be facilely brought into abutting contact. The measuring roller pressure arrangement 32 applies pressure or force to the measuring roller 18R after it is in abutment with the wheel 11R so that said wheel rotates said measuring roller. The measuring roller pressure arrangement 32 may include an air or hydraulic piston 44, an air or hydraulic fluid pump 45 and suitable conduits (not shown).

Figure 3:
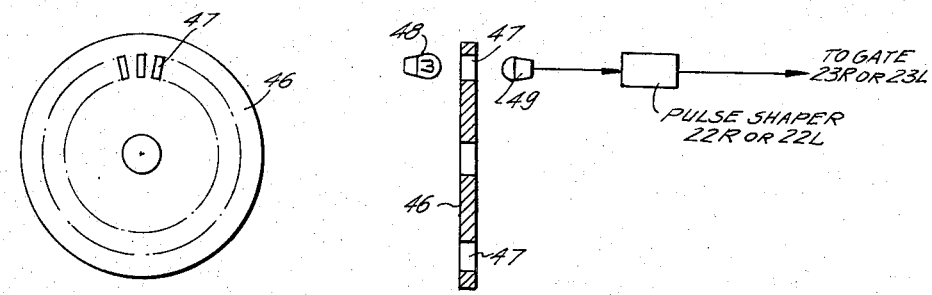
FIG. 3 is a schematic diagram of an embodiment of the pulse generator 21R or 21L of the control system of FIG. 1.

FIG. 3 illustrates a pulse generator which may be utilized as the pulse generator 21R or as the pulse generator 21L. A disc 46 has a number of radially extending slots 47 formed therethrough at equal radial distances from the center of said disc and having equal radial lengths and equal widths. The disc 46 is shown both in plan and sectional view in FIG. 3. A source of light such as, for example, a lamp 48, is provided adjacent the slots 47 on one side of the disc 46 and a photosensitive or photoresponsive unit such as, for example, a photocell 49, is provided adjacent the slots 47 on the other side of the disc 46. The output of the photocell 49 is supplied to the corresponding pulse shaper 22R or 22L.

When the measuring roller 18R or 18L is rotated by rotation of the corresponding wheel, the corresponding disc 46 is rotated and the intermittent light through the slots 47 of said disc causes the photocell 49 to produce a number of pulses corresponding in number to the angle of rotation of said disc and therefore corresponding to the diameter of the corresponding wheel. In an operating embodiment of the present invention, the disc 46 is designed to produce 8,700 pulses for one revolution of a wheel having an average diameter of 870 mm.

Figure 4:
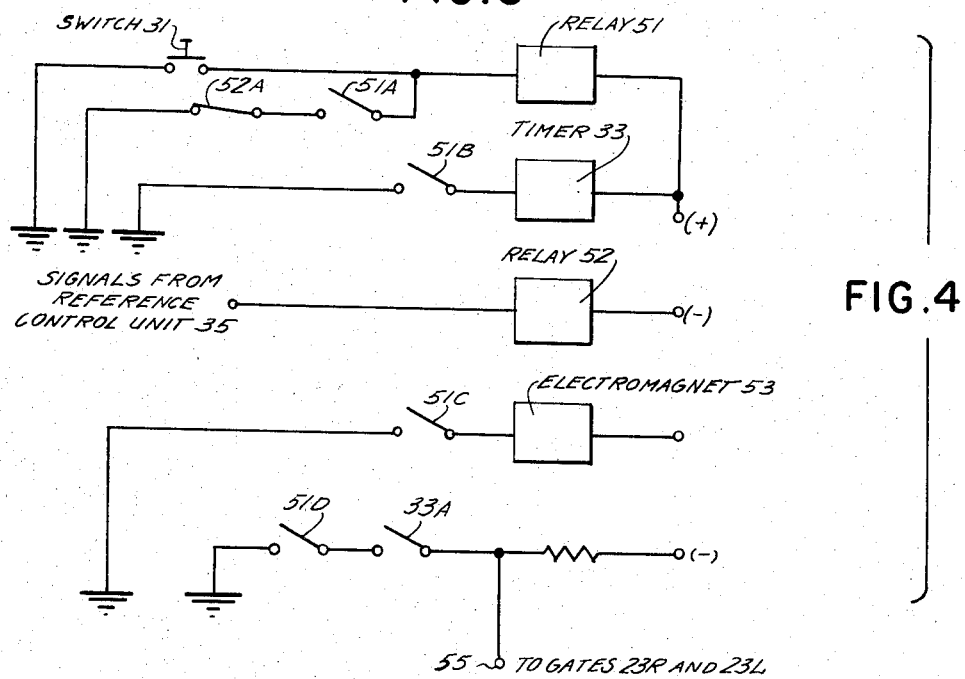
FIG. 4 is a block diagram of an embodiment of the switch 31 and timer 33 of the control system of FIG. 1.

FIG. 4 shows a switch and timer which may be utilized as the switch 31 and the timer 33. When the switch 31 is actuated, operated or closed, it energizes a relay 51. When the relay 51 is energized, it closes a self-holding circuit via its armature 51A and a normally closed armature 52A of a relay 52. The relay 51, in its energized condition, then closes its armature 51B and thereby energizes the timer 33. The timer 33 includes a relay and has an armature 33A.

When the relay 51 is energized, it closes its armature 51C and thereby energizes an electromagnet 53 which then applies magnetic force to urge a corresponding one of the measuring rollers 18R and 18L into peripheral surface contact with the corresponding wheel. The relay 51, in its energized condition, then closes its armature 51D. When the timer 33 is energized by the closing of the armature 51B, its armature 33A is closed, so that the negative potential applied to the armatures 33A and 51D goes to ground and is ineffective.

After a period of time, the relay of the timer 33 becomes deenergized, so that the armature 33A is opened and the negative potential formerly grounded, is applied to the gates 23R and 23L to switch said gates to their conductive condition. When the relay 52 is energized in a manner explained with reference to FIG. 9, it opens its armature 52A to deenergize the relay 51. The terminal 55 connects the negative potential to the gates 23R and 23L.

Figure 5:
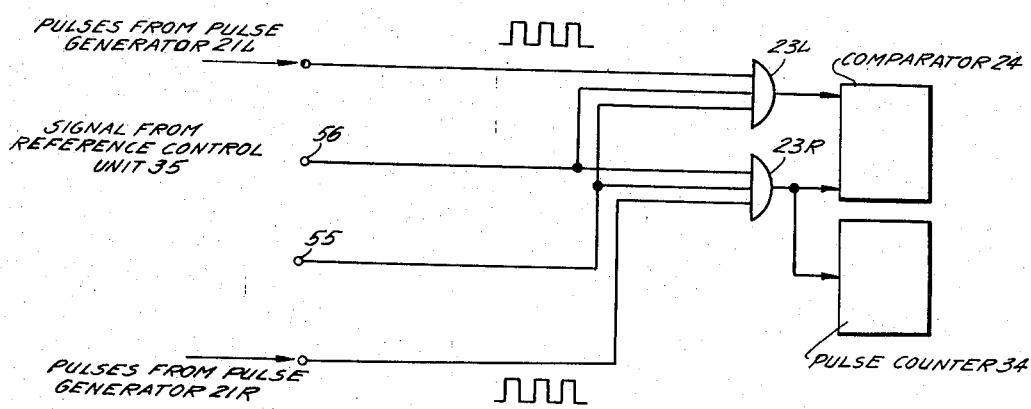
FIG. 5 is a block diagram of an embodiment of the gates 23R and 23L of the control system of FIG. 1.

FIG. 5 shows gates which may be utilized as the gates 23R and 23L. Each of the gates 23R and 23L is an AND gate and each of said gates is switched to its conductive condition by the negative potential at the terminal 55, and the pulses produced by the pulse generators 21R and 21L are transferred by said gates to the comparator 24. The pulses from the pulse generator 21R are transferred by the gate 23R to the pulse counter 34. The reference control unit 35 supplies a signal "1" to the gates 23R and 23L via a terminal 56 during the measuring operation.

Figure 6:
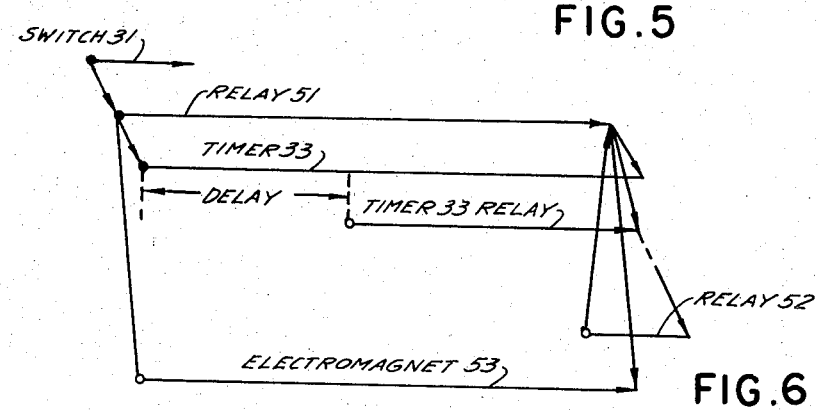
FIG. 6 is a graphical presentation of the operation of FIG. 4.

FIG. 6 graphically illustrates the operation of FIG. 4. In FIG. 6, the horizontal lines indicate time, each component being energized, operated or actuated for a period of time indicated by the horizontal line so labelled.

Figure 8:
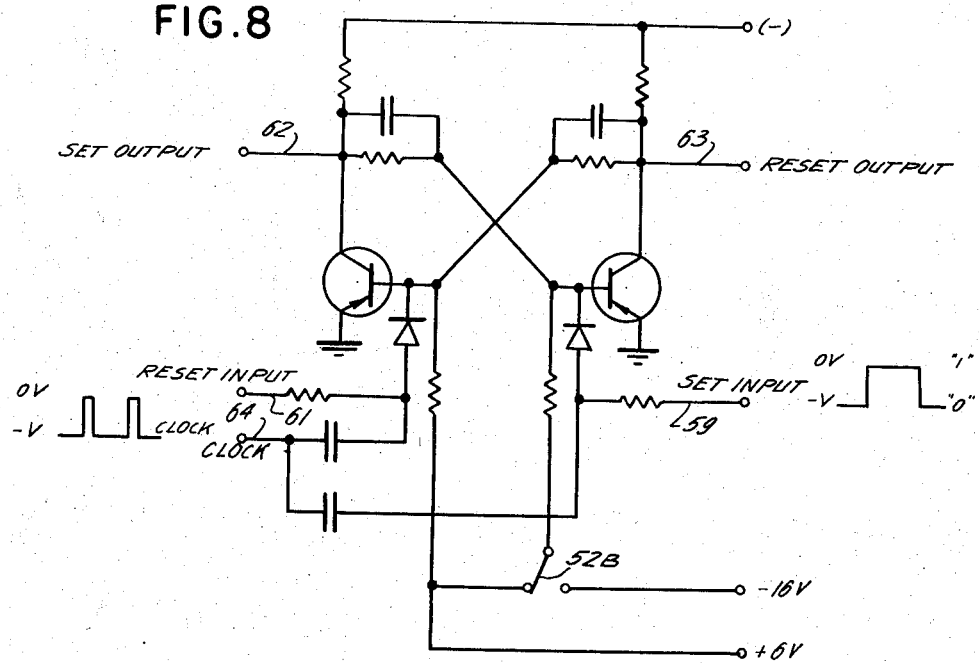
FIG. 8 is a circuit diagram of an embodiment of a flip1flop circuit of the embodiment of FIG. 7.

FIG. 7 shows a pulse counter which may be utilized as the pulse counter 34 and FIG. 8 is a flip-flop circuit which may be utilized as each of the flip-flops of FIG. 7. A plurality of flip-flops or bistable multivibrators 57a, 57b, 75c, 57n, comprising, for example, fifteen flip-flops, are connected to the output of a blocking oscillator 58. A signal output from the gate 23R is connected to the input of the blocking oscillator 58. The circuit of each of the flip-flops 57a to 57n may comprise that of FIG. 8.

Each of the flip-flops 57a to 57n has a set input 59, a reset input 61, a set output 62, a reset output 63 and a clock input 64. The clocks are provided by the blocking oscillator 58. An AND gate 65b is connected with one signal input 66 connected to the set output 62a of the flip-flop 57a, another signal input 67 connected to the reset output 63b of the flip-flop 57b and a signal output connected to the set input 59b of the flip-flop 57b. An AND gate 68b is connected with one signal input 69 connected to the set output 62a of the flip-flop 57a, another signal input 71 connected to the set output 62b of the flip-flop 57 b and a signal output connected to the reset input 61b of the flip-flop 57b.

An AND gate 65c is connected with one signal input 72 connected to the reset input 61b of the flip-flop 57b, another signal input 73 connected to the reset output 63c of the flip-flop 57c and a signal output connected to the set input 59c of the flip-flop 57c. An AND gate 68c is connected with one signal input 74 connected to the reset input 61b of the flip-flop 57b, another signal input 75 connected to the set output 62c of the flip-flop 57c and a signal output connected to the reset input 61c of the flip-flop 57c. The flip-flops 57a, 67b, 57c, 57n have reset outputs 76a, 76b, 76c, 76n, respectively, and set outputs 77a, 77b, 77c, 77n, respectively.

If each flip-flop is assumed to be in its initial or zero condition, as soon as pulses are supplied from the gate 23R to the blocking oscillator 58, the flip-flop 57a is switched in condition, and each of the following flip-flops 57b to 57n registers or counts the pulses provided by the gate 23R as a binary number. The output terminals 76a and 77a, 76b and 77b, 76c and 77c to 76n and 77n indicate the number registered in the pulse counter 34.

FIG. 9 shows a reference control unit which may be utilized as the reference control unit 35. In an operating embodiment of the control system of the present invention, the reference control unit 35 is set to a magnitude which equals the number of pulses generated when a wheel having an average diameter of 870 mm. completes two revolutions. The reference control unit 35 is thus set to 17,400, which may be expressed in a binary system as $2^3+2^4+2^5+2^6+2^7+2^8+2^9+2^{14}$. The output terminals of the flip-flops of the pulse counter 34 (FIG. 7) connected as the inputs to the AND gates 78, 79 and 81 of FIG. 9 are thus 76a, 76b, 76c, 77d, 77e, 77d, 77g, 77h, 77i, 77j, 76k, 76l, 76m, 76n and 77o.

When the pulse counter 34 registers or counts 17,400 pulses, a flip-flop 82 is switched in condition by an AND gate 83 which is connected between the outputs of the AND gates 78, 79 and 81 and the set input 84 of the flip-flop 82. The set output 85 of the flip-flop 82 is then "1" and the reset output 86 of said flip-flop is "0." The "1" signal thus switches the gates 23R and 23L (FIGS. 1 and 5) to their non-conductive condition and the "0" signal terminates the supply of input pulses to the comparator 24. The set output 85 of the flip-flop 82 may be amplified by an amplifier 87.

The set output signal "1" of the flip-flop 82 institutes the presetting of the difference output produced by the comparator 24 in the preset counter 26 and energizes the relay 52 of FIG. 4. Energization of the relay 52 deenergizes the relay 51 of FIG. 4 via the armature 52A and deenergizes the electromagnet 53 by deenergization of said relay 51 (FIG. 4). The measuring rollers 18R and 18L are thus removed from abutting contact with the corresponding wheels. Energization of the relay 52 of FIG. 4 actuates its armature 52B in the flip-flop circuit of FIG. 8 and thereby switches all the flip-flops of the pulse counter 34 to their "0" or zero condition and actuates its armature 52C in the flip-flop circuit of FIG. 11 and thereby switches all the flip-flops of the comparator 24 to their zero condition.

Figure 10:
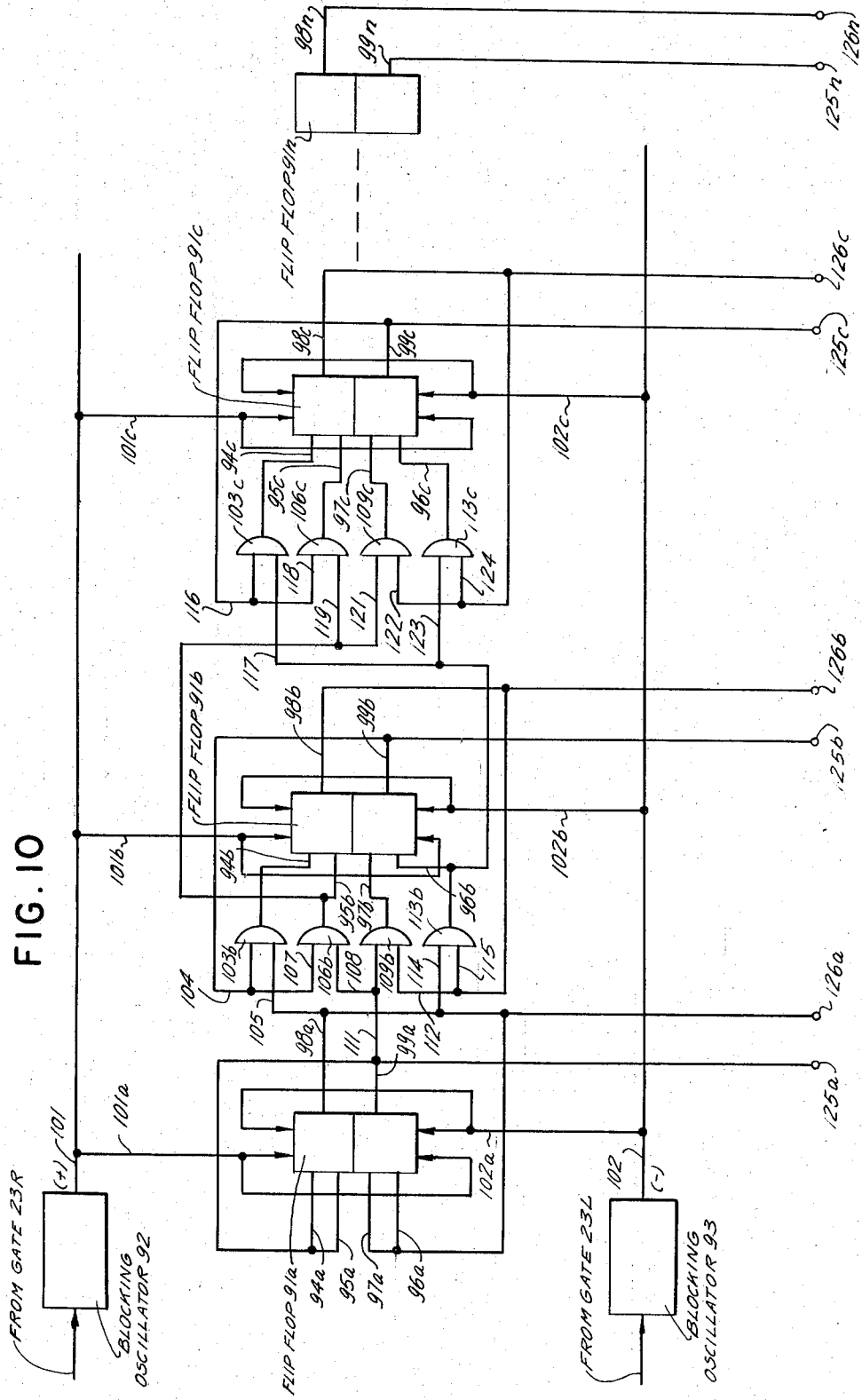
FIG. 10 is a block diagram of an embodiment of the comparator 24 of the control system of FIG. 1.
Figure 11:
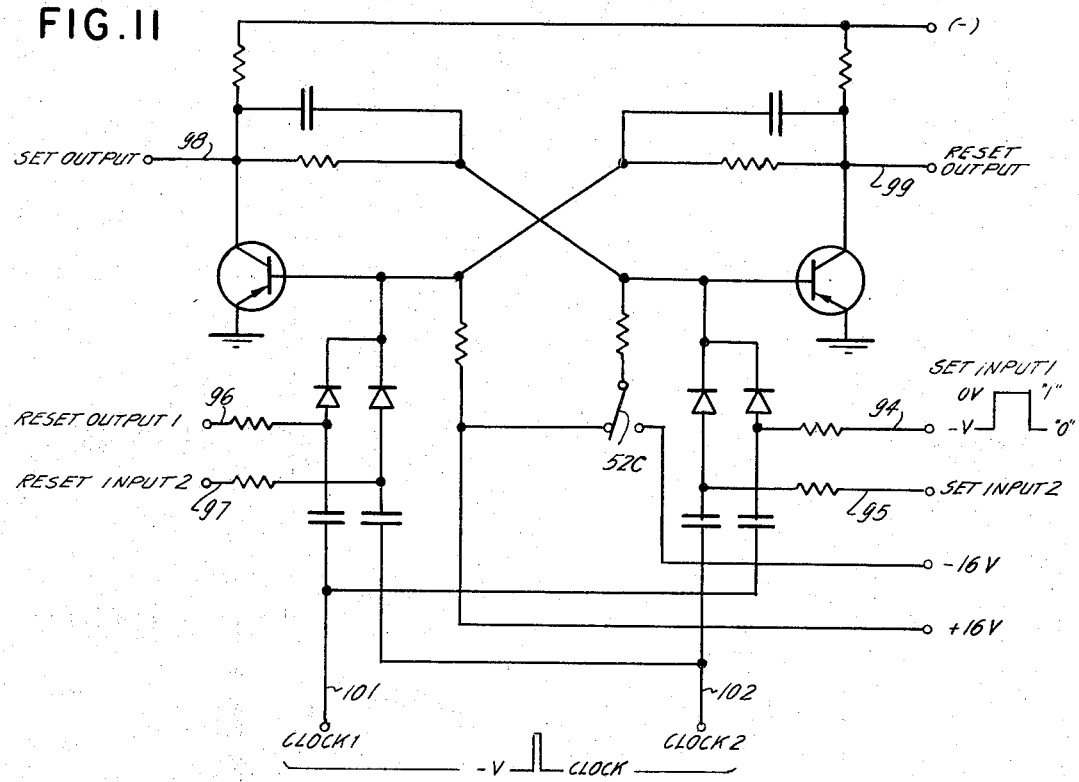
FIG. 11 is a circuit diagram of an embodiment of a flip-flop circuit of the embodiment of FIG. 10.

FIG. 10 illustrates a comparator which may be utilized as the comparator 24 and FIG. 11 is a flip-flop circuit which may be utilized as each of the flip-flops of FIG. 10. A plurality of flip-flops or bistable multivibrators 91a, 91b, 91c, 91n are connected to the outputs of blocking oscillators 92 and 93. A signal output from the gate 23R is connected to the input of the blocking oscillator 92 and a signal output from the gate 23L is connected to the input of the blocking oscillator 93. The circuit of each of the flip-flops 91a to 91n may comprise that of FIG. 11.

Each of the flip-flops 91a to 91n has a first set input 94, a second set input 95, a first reset input 96, a second reset input 97, a set output 98, a reset output 99, a first clock input 101 and a second clock input 102. The first clocks are provided by the blocking oscillator 92 and the second clocks are provided by the blocking oscillator 93. An AND gate 103b is connected with one signal input 104 connected to the reset output 99b of the flip-flop 91b, another signal input 105 connected to the set output 98a of the flip-flop 91a and a signal output connected to the first set input 94b of the flip-flop 91b.

An AND gate 106b is connected with one signal input 107 connected to the reset output 99b of the flip-flop 91b, another signal input 108 connected to the reset output 99a of the flip-flop 91a and a signal output connected to the second set input 95b of the flip-flop 91b. An AND gate 109b is connected with one signal input 111 connected to the reset output 99a of the flip-flop 91a, another signal input 112 connected to the set output 98b of the flip-flop 91b and a signal output connected to the second reset input 97b of the flip-flop 91b. An AND gate 113b is connected with one signal input 114 connected to the set output 98a of the flip-flop 91a, another signal input 115 connected to the set output 98b of the flip-flop 91b and a signal output connected to the first reset input 96b of the flip-flop 91b.

An AND gate 103c is connected with one signal input 116 connected to the reset output 99c of the flip-flop 91c, another signal input 117 connected to the first reset input 96b of the flip-flop 91b and a signal output connected to the first set input 94c of the flip-flop 91c. An AND gate 106c is connected with one signal input 118 connected to the reset output 99c of the flip-flop 91c, another signal input 119 connected to the second set input 95b of the flip-flop 91b and a signal output connected to the second set input 95c of the flip-flop 91c. An AND gate 109c is connected with one signal input 121 connected to the second set input 95b of the flip-flop 91b, another signal input 122 connected to the set output 98c of the flip-flop 91c and a signal output connected to the second reset input 97c of the flip-flop 91c.

An AND gate 113c is connected with one signal input 123 connected to the first reset input 96b of the flip-flop 91b, another signal input 124 connected to the set output 98c of the flip-flop 91c and a signal output connected to the first reset input 96c of the flip-flop 91c. The flip-flops 91a, 91b, 91c, 91n have reset outputs 125a, 125b, 125c, 125n, respectively, and set outputs 126a, 126b, 126c, 126n, respectively. If each flip-flop is assumed to be in its initial or zero condition, when a pulse is supplied from the gate 23R to the blocking oscillator 92, the comparator functions to register, count or add "1" and when a pulse is supplied from the gate 23L to the blocking oscillator 93, the comparator functions to register, count or add "−1", that is, to subtract "1".

Figure 13:
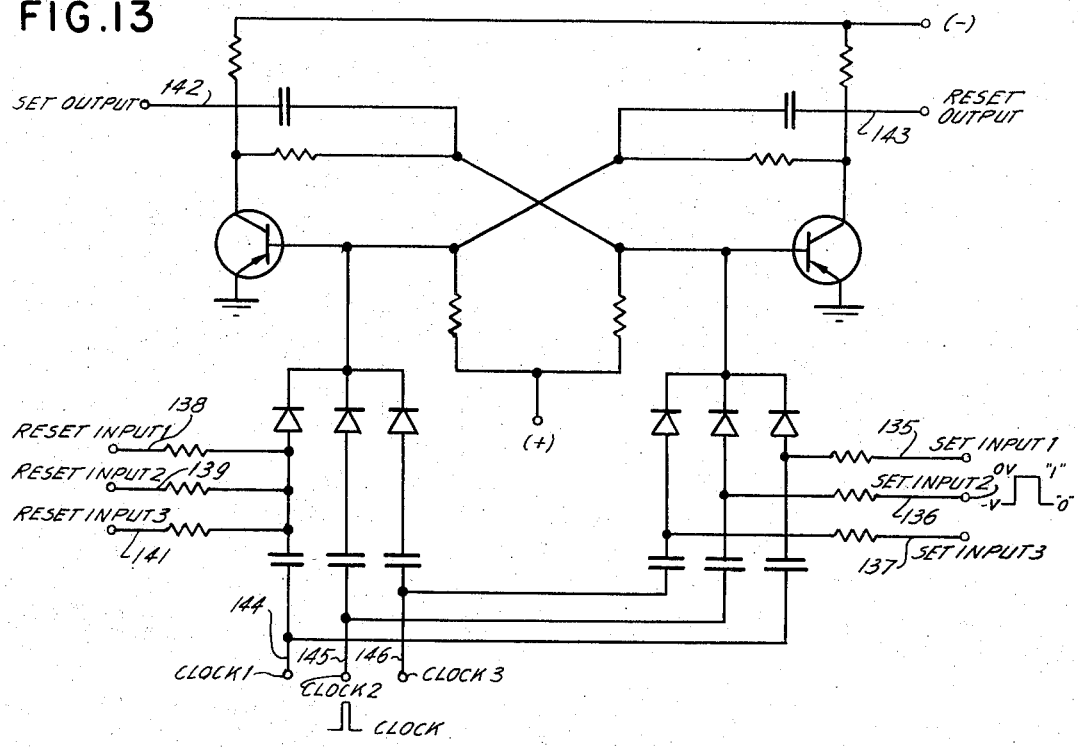
FIG. 13 is a circuit diagram of an embodiment of a flip-flop circuit of the embodiment of FIG. 12.

FIG. 12 illustrates a preset counter which may be utilized as the preset counter 26 and FIG. 13 is a flip-flop circuit which may be utilized as each of the flip-flops of FIG. 12. A plurality of flip-flops or bistable multivibrators 131a, 131b, 131c, 131n are connected to the outputs of blocking oscillators 132, 133 and 134. An output signal from the reference control unit 35 is supplied to the input of the blocking oscillator 132, a signal output from the gate 28L is connected to the input of the blocking oscillator 133 and a signal output from the gate 28R is connected to the input of the blocking oscillator 134. The circuit of each of the flip-flops 131a to 131n may comprise that of FIG. 13.

Each of the flip-flops 131a to 134n has a first set input 135, a second set input 136, a third set input 137, a first reset input 138, a second reset input 139, a third reset input 141, a set output 142, a reset output 143, a first clock input 144, a second clock input 145 and a third clock input 146. The first clocks are provided by the blocking oscillator 132, the second clocks are provided by the blocking oscillator 134 and the third clocks are provided by the blocking oscillator 133. An AND gate 147b is connected with one signal input 148 connected to the reset output 143b of the flip-flop 131b, another signal input 149 connected to the set output 142a of the flip-flop 131a and a signal output connected to the third set input 137b of the flip-flop 131b.

An AND gate 151b is connected with the signal input 152 connected to the reset output 143b of the flip-flop 131b, another signal input 153 connected to the reset output 143a of the flip-flop 131a and a signal output connected to the second set input 136b of the flip-flop 131b. An AND gate 154b is connected with one signal input 155 connected to the reset output 143a of the flip-flop 131a, another signal input 156 connected to the set output 142b of the flip-flop 131b and a signal output connected to the second reset input 139b of the flip-flop 131b. An AND gate 157b is connected with one signal input 158 connected to the set output 142a and the second and third reset inputs 139a and 141a of the flip-flop 131a, another signal input 159 connected to the set output 142b of the flip-flop 131b and a signal output connected to the third reset input 141b of the flip-flop 131b.

The reset output 125a of the flip-flop 91a of the comparator of FIG. 10 is connected to the first reset input 138a of the flip-flop 131a. The set output 126a of the flip-flop 91a of the comparator of FIG. 10 is connected to the first set input 135a of the flip-flop 131a. The reset output 125b of the flip-flop 91b of the comparator of FIG. 10 is connected to the first reset input 138b of the flip-flop 131b. The set output 126b of the flip-flop 91b of the comparator of FIG. 10 is connected to the first set input 135b of the flip-flop 131b. The reset output 125c of the flip-flop 91c of the comparator of FIG. 10 is connected to the first reset input 138c of the flip-flop 131c. The set output 126c of the flip-flop 91c of the comparator of FIG. 10 is connected to the first set input 135c of the flip-flop 131c. This is continued to the $n^{th}$ flip-flop of each of FIGS. 10 and 12.

An AND gate 147c is connected with one signal input 161 connected to the reset output 143c of the flip-flop 131c, another signal input 162 connected to the third reset input 141b of the flip-flop 131b and a signal output connected to the third signal input 137c of the flip-flop 131c. An AND gate 151c is connected with one signal input 163 connected to the reset output 143c of the flip-flop 131c, another signal input 164 connected to the second set input 136b of the flip-flop 131b and a signal output connected to the second set input 136c of the flip-flop 131c. An AND gate 154c is connected with one signal input 165 connected to the second set input 136b of the flip-flop 131b, another signal input 166 connected to the set output 142c of the flip-flop 131c and a signal output connected to the second reset input 139c of the flip-flop 131c.

An AND gate 157c is connected with one signal input 167 connected to the third reset input 141b of the flip-flop 131b, another signal input 168 connected to the set output 142c of the flip-flop 131c and a signal output connected to the third reset input 141c of the flip-flop 131c. The flip-flops 131a, 131b, 131c, 131n have reset outputs 169a, 169b, 169c, 169n, respectively, and set outputs 171a, 171b, 171c, 171n, respectively. When the pulse counter 34 registers or counts a predetermined magnitude such as, for example, 17,400, the blocking oscillator 132 of the preset counter 26 of FIG. 12 is operated by the output signal from the reference control unit 35 of FIG. 9 and the count of the comparator 24 is preset in said preset counter.

If the number preset in the preset counter 26 is a positive number such as, for example, +2, it may be expressed in binary code as 0100 or zero or "0". If the number preset in the preset counter 26 is a negative number such as, for example, −2, it may be expressed as 0111 or "1". The sign or polarity of the number or magnitude preset in the preset counter 26 may thus be readily detected by the last flip-flop 131n of said preset counter; the flip-flop 131n functioning as the sign detector 27 (FIG. 1). If the diameter of the wheel 11R is greater than the diameter of the wheel 11L, the number preset in the preset counter 26 is positive, so that the flip-flop 131n is in its zero, "0" or reset condition and an output signal "1" is provided at its reset output 169n. If the diameter of the wheel 11R is less than the diameter of the wheel 11L, the number preset in the preset counter 26 is negative, so that the flip-flop 131n is in its "1" or set condition and an output signal "1" is provided at its set output 171n.

Figure 14:
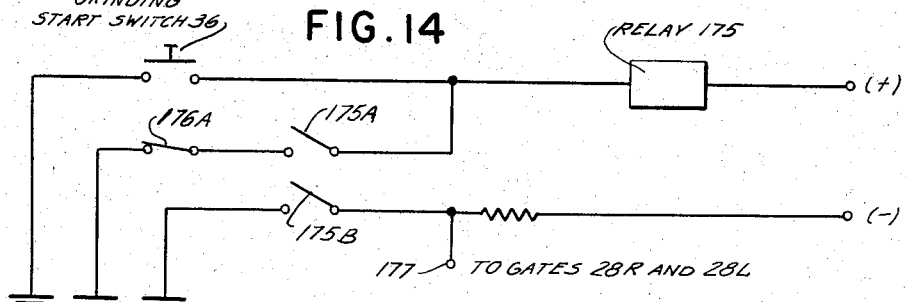
FIG. 14 is a circuit diagram of an embodiment of the grinding start switch 36 of the control system of FIG. 1.
Figure 15:
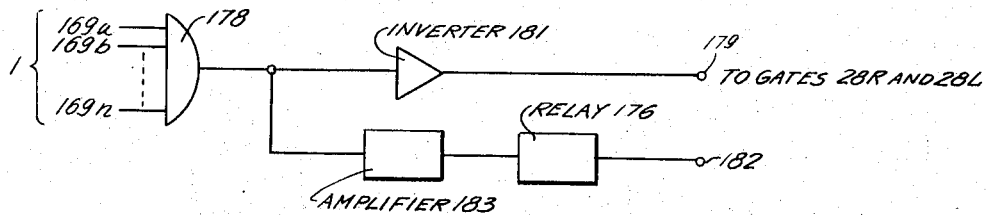
FIG. 15 is a block diagram of an embodiment of a grinding termination circuit for use in conjunction with the sign detector 27 of the control system of FIG. 1.

FIG. 14 shows a switch which may be utilized as the grinding start switch 36. When the switch 36 is closed or actuated, it energizes a relay 175. When the relay 175 is energized, it closes a self-holding circuit via its armature 175A and the normally closed armature 176A of a relay 176 (FIG. 15). When the relay 175 is energized, it also closes its armature 175B which closes a negative potential circuit so that negative potential is provided at a terminal 177, whence the negative potential is applied to the gates 28R and 28L of the control system of FIG. 1. The negative potential at the terminal 177 is the grinding start signal.

FIG. 15 illustrates a grinding termination circuit which may be utilized, in conjunction with the sign detector 27, to indicate when the count of the preset counter 26 has reached zero, during the grinding operation. The reset outputs 169a to 169n of the flip-flops 131a to 131n of the preset counter of FIG. 12 are connected as signal inputs to an AND gate 178. The signal output of the gate 178 is connected to a terminal 179 via an inverter 181 and to a terminal 182 via an amplifier 183 and the relay 176. If the count or stored content of the preset counter 26 is not zero, but is, instead, a positive or negative number or magnitude, a zero signal is provided at the terminal 179, due to the operation of the inverter 181 in changing a signal to "no signal". If the count or stored content of the preset counter 26 is a positive or negative magnitude, the output of the AND gate 178 energizes the relay 176. When the relay 176 is energized, it opens its armature 176A to deenergize the relay 175 and thereby terminate the provision of the grinding start signal at the terminal 177 (FIG. 14).

Figure 16:
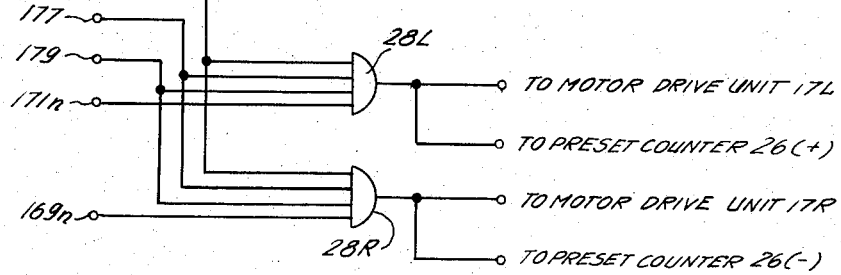
FIG. 16 is a block diagram of an embodiment of the gates 28R and 28L of the control system of FIG. 1.

FIG. 16 shows a pair of gates which may be utilized as the gates 28R and 28L. The gates 28R and 28L are AND gates. The pulses produced by the pulse generator 29 are supplied to a signal input of each AND gate 28R and 28L via a terminal 184. The grinding start signal provided at the terminal 177 of FIG. 14 is supplied to another signal input of each AND gate 28R and 28L. The signal provided at the terminal 179 of FIG. 15 is supplied to another signal input of each AND gate 28R and 28L. The set output 171n of the flip-flop 131n of the preset counter of FIG. 12 is supplied to the last signal input of the AND gate 28L and the reset output 169n of said flip-flop is supplied to the last signal input of the AND gate 28R.

If the diameter of the wheel 11R is greater than the diameter of the wheel 11L, the AND gate 28R is switched to its conductive condition and the AND gate 28L is switched to its non-conductive condition, and the peripheral surface of the wheel 11R is ground down by the thereby actuated corresponding grinding arrangement 17R, 16R, 15R, 14R and 13R. If the diameter of the wheel 11R is less than the diameter of the wheel 11L, the AND gate 28R is switched to its nonconductive condition and the AND gate 28L is switched to its conductive condition, and the peripheral surface of the wheel 11L is ground down by the thereby actuated corresponding grinding arrangement 17L, 16L, 15L, 14L and 13L.

If the diameter of the wheel 11R is greater than the diameter of the wheel 11L, the gate 28R is switched to its conductive condition and pulses produced by the pulse generator 29 are transferred through said gate to the motor drive unit 17R of the control system of FIG. 1. The pulses produced by the pulse generator 29 are simultaneously transferred through the gate 28R to the blocking oscillator 134 of the present counter 26 of FIGS. 1 and 12, so that each time a pulse is supplied to said blocking oscillator, a second clock, or clock 2 signal, is produced by the said blocking oscillator and a "1" is subtracted from the number of magnitude preset in the preset counter 26.

When the number or magnitude preset in the preset counter 26 has been reduced to zero, by subtraction therefrom due to the transfer of pulses by the AND gate 28R, the output of the inverter 181 at the terminal 179 of FIG. 15 is zero, so that said AND gate 28R is switched to its non-conductive condition and blocks pulses from the pulse generator 29 from reaching the motor drive unit 17R. Thus, the motor drive unit 17R is supplied only with the same number of pulses as the preset number in the preset counter 26.

Figure 18:
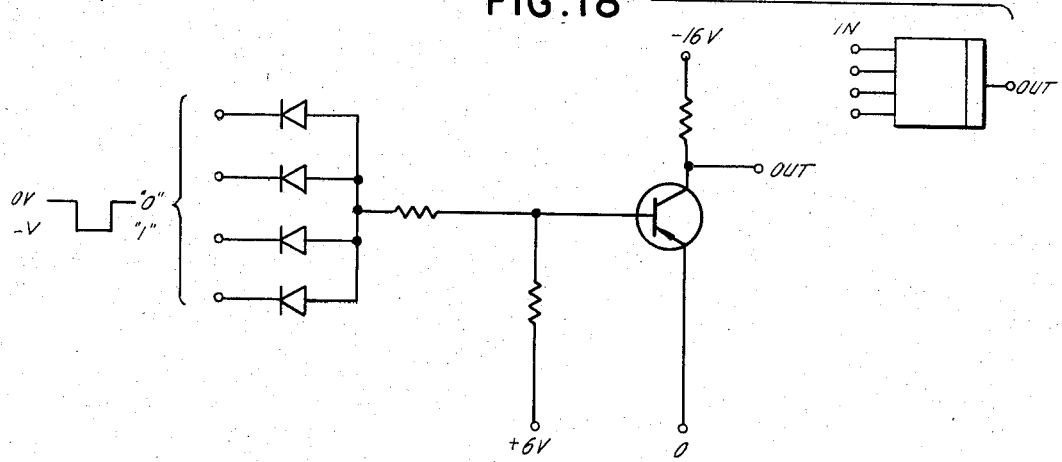
FIG. 18 is a circuit diagram of an embodiment of a NOR circuit of the embodiment of FIG. 17.

FIG. 17 illustrates a motor drive unit which may be utilized as the motor drive units 17R and 17L and FIG. 18 is a NOR circuit which may be utilized as each of the NOR circuits of FIG. 17. The motor drive unit of FIG. 17 comprises a plurality of NOR circuits 186, 187, 188, 189, 191, 192, 193, 194, 195, 196, 197, 198, 199, 201, 202, 203, 204, 205, 206, 207, 208, 209, 211, 212, 213, 214, 215, 216, 217 and 218. The NOR circuits 216, 217 and 218 are in the output stage. The NOR circuits 217 and 218 are in their "1" condition, whereas the NOR circuit 216 is in its "0" condition. The outputs of the NOR circuits 216, 217 and 218 are the outputs of the motor drive unit.

The output of the NOR circuit 216 is amplified in a current amplifier 219a and is then supplied to a coil 221a of an electrohydraulic pulse motor 16R or 16L. The output of the NOR circuit 217 is amplified in a current amplifier 219b and is then supplied to a coil 221b of the electrohydraulic pulse motor. The output of the NOR circuit 218 is amplified in a current amplifier 219c and is then supplied to a coil 221c of the electrohydraulic pulse motor. Since each of the NOR circuits 217 and 218 is in its "1" condition, the coils 221b and 221c connected thereto are energized.

When a pulse is supplied to an input terminal 222 of the motor drive unit from the pulse generator 29 via one of the gates 28R and 28L, the electrohydraulic pulse motor is rotated in one direction such as, for example, a clockwise direction. When a pulse is supplied to the input terminal 222, the conditions of the NOR circuits 216, 217 and 218 vary from their first condition in which the NOR circuit 216 is in its "0" condition and each of the NOR circuits 217 and 218 is in its "1" condition, to their second condition in which the NOR circuits 216 and 218 are each in their "1" condition and the NOR circuit 217 is in its "0" condition, to their third condition in which each of the NOR circuits 216 and 217 is in its "1" condition and the NOR circuit 218 is in its "0" condition. It is thus seen that each time a pulse is supplied to the input terminal 222, a different pair of the coils 221a, 221b and 221c of the electrohydraulic pulse motor is energized.

When a pulse is supplied to an input terminal 223 of the motor drive unit from the pulse generator 29 via the other of the gates 28R and 28L, the electrohydraulic pulse motor is rotated in the other direction such as, for example, a counterclockwise direction. When the electrohydraulic pulse motor rotates, it rotates only through a determined angle, for each pulse supplied from the pulse generator 29.

Figure 20:
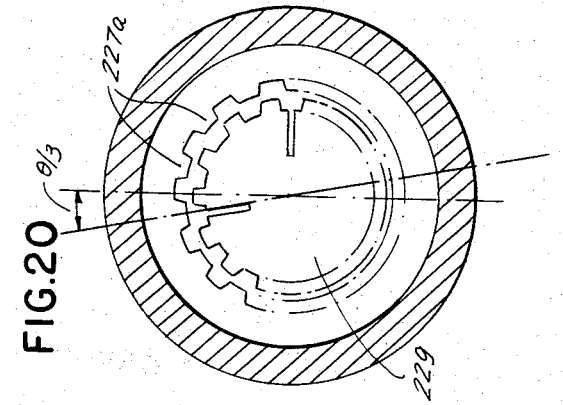
FIG. 20 is a view taken along the lines XX—XX of FIG. 19.
Figure 22:
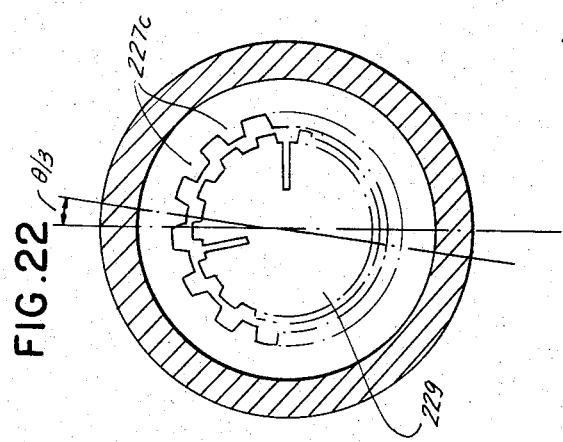
FIG. 22 is a view taken along the lines XXII—XXII of FIG. 19.
Figure 21:
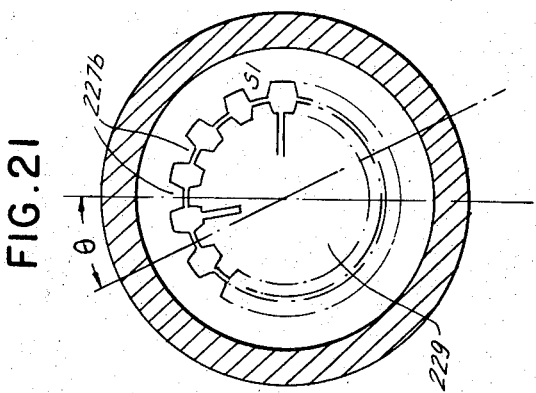
FIG. 21 is a view taken along the lines XXI—XXI of FIG. 19.
Figure 19:
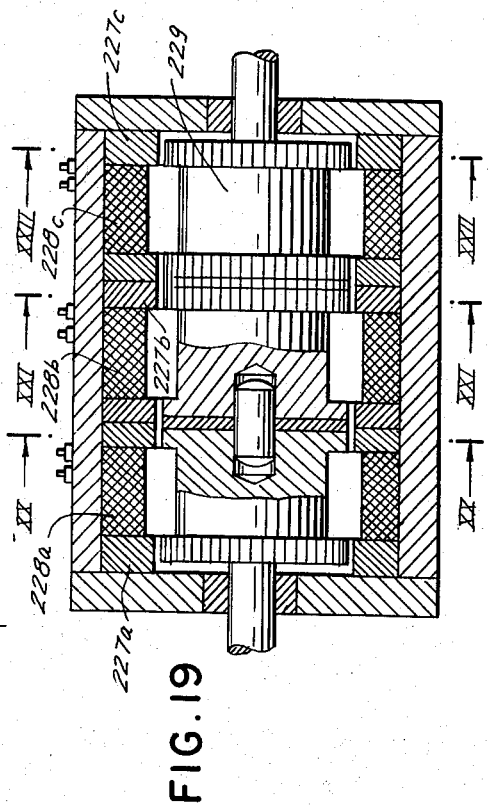
FIG. 19 is a schematic diagram, partly in section, of an embodiment of a pulse motor part of the electrodynamic pulse motor 16R or 16L of the control system of FIG. 1.

FIG. 19 shows a pulse motor which may be utilized as part of the electrohydraulic pulse motor 16R or 16L. The pulse motor of FIG. 19 comprises three stators 227a, 227b and 227c, three coils or windings 228a, 228b and 228c wound on said stators and a rotor 229 comprising three coaxially aligned sections. The coil 228a is wound on the stator 227a, the coil 228b is wound on the stator 227b and the coil 228c is wound on the stator 227c. As shown in FIGS. 20, 21 and 22, which are sectional views through each of the stators, the teeth of each of the stators 227a, 227b and 227c are shifted from each other by one third the pitch $\theta$, whereas the teeth of the rotor sections are aligned.

Figures 23A, 23B, 23C, 25, 26:
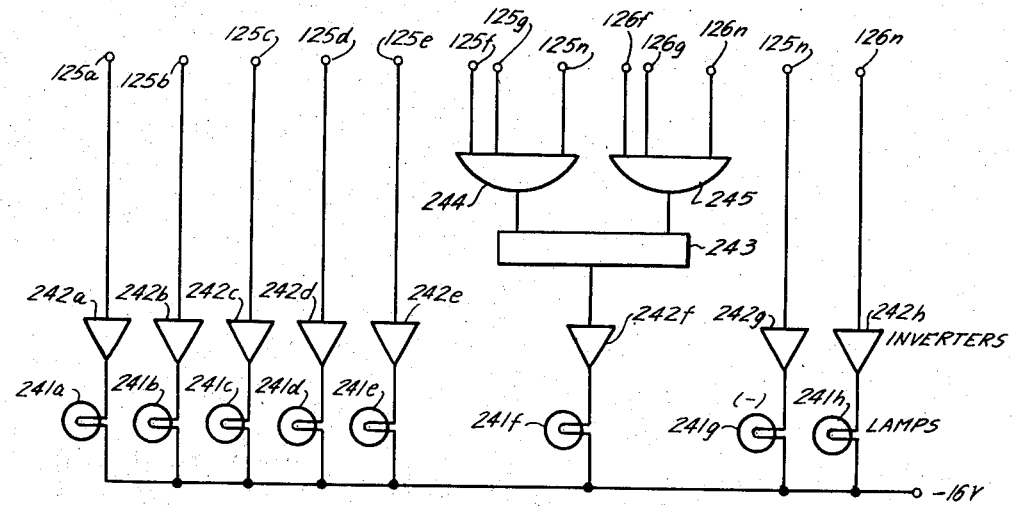
FIGS. 23A, 23B and 23C are developed views of the stator and rotor teeth of the pulse rotor of FIG. 19.
FIG. 25 is a block diagram of an embodiment of an indicator 25 of the control system of FIG. 1.
FIG. 26 is a circuit diagram of an embodiment of an inverter of the embodiment of FIG. 25.

FIGS. 23A, 23B and 23C are developed views of the stator and rotor teeth of the pulse motor of FIG. 19. When the coils 228b and 228c of the stators 227b and 227c are energized, the teeth of the rotor 229 are positioned between the teeth of said stators, as shown in FIG. 23A. When the coils 228c and 228a of the stators 227c and 227b are energized, the teeth of the rotor 229 are positioned between the teeth of said stators, as shown in FIG. 23B. When the coils 228a and 228b of the stators 227a and 227b are energized, the teeth of the rotor 229 are positioned between the teeth of said stators, as shown in FIG. 23C. The rotor 229 of the pulse motor of FIG. 19 thus rotates a determined angle in a determined direction for each pulse supplied from the pulse generator 29.

FIG. 24 illustrates an electrohydraulic pulse motor which may be utilized as the electrohydraulic pulse motor 16R or 16L. Each electrohydraulic pulse motor 16R and 16L comprises a pulse or stepping motor, as shown in FIG. 19 and a hydraulic motor combined with the pulse motor. The electrohydraulic pulse motor of FIG. 24 comprises the pulse motor of FIG. 19, a pilot valve 231 for enabling said pulse motor to change the pressure of the hydraulic fluid or oil, and a hydraulic motor 232.

The hydraulic motor 232 is rotated by the pressure of the hydraulic fluid which is supplied by a hydraulic power supply 233 and which is controlled by the pulse motor via the pilot valve 231. When the pulse motor rotates through a determined angle, the pilot valve 231 rotates through the same angle and at the same time said pilot valve is moved axially, for example, to the left, by a threaded member or screw 234. The axial movement of the pilot valve 231 provides hydraulic fluid under pressure from the hydraulic power supply 233, through the cylinder in which said pilot valve is positioned, to a cylinder block 235 and applies pressure to a piston 236, positioned in said cylinder block, to cause rotation of the said cylinder block.

The rotation of the cylinder block 235 of the hydraulic motor 232 is imparted to an output shaft 237. When the shaft 237 rotates, it turns a threaded member 238 cooperating with the threaded member 234 in a direction which moves the pilot valve 231 in its opposite axial direction, for example, to the right. The pilot valve 231 is thus returned to its initial position, as shown in FIG. 24, and blocks the supply of hydraulic fluid from the hydraulic power supply 233.

The angle of rotation of the output shaft 237 of the hydraulic motor 232 is in direct proportion with the angle of rotation of the pilot valve 231. The angle of rotation of the output shaft 237 is thus in direct proportion with the angle of rotation of the pulse motor and therefore with the number of pulses supplied to said pulse motor. Thus, the supply of a number of pulses corresponding in number to the difference in diameter between the wheels 11R and 11L (FIG. 1) to the electrohydraulic pulse motor causes, via said electrohydraulic pulse motor, the operation of the grindstone 13R or 13L via the corresponding feed screw 15R or 15L for a period of time corresponding to such difference in diameter.

FIG. 25 shows an indicator which may be utilized as the indicator 25 and FIG. 26 is an inverter which may be utilized as each of the inverters of FIG. 25. The indicator 25 comprises a plurality of lamps 241a, 241b, 241c, 241d, 241e, 241f, 241g and 241h, since the number or magnitude to be indicated is usually a small one. One terminal of each of the lamps 241a to 241h is connected to a source of negative potential. The other terminal of each of the lamps 241a to 241h is connected through an inverter to the reset and set outputs of the flip-flops 91a to 91n of the comparator 24 (FIGS. 1 and 10).

The lamp 241a is connected to the reset output terminal 125a of the flip-flop 91a of the comparator 24 via an inverter 242a. The lamp 241b is connected to the reset output terminal 125b of the flip-flop 91b of the comparator 24 via an inverter 242b. The lamp 241c is connected to the reset output terminal 125c of the flip-flop 91c of the comparator 24 via an inverter 242c. The lamp 241d is connected to the reset output terminal 125d of the flip-flop 91d of the comparator 24 via an inverter 242d. The lamp 241e is connected to the reset output terminal 125e of the flip-flop 91e of the comparator 24 via an inverter 242e. The lamp 241f is connected to an OR gate 243 via an inverter 242f. The OR gate 243 is connected to the signal output of an AND gate 244 and to the signal output of an AND gate 245. The reset output terminals 125f to 125n of the flip-flops 91f to 91n of the comparator 24 are connected to signal inputs of the AND gate 244. The set output terminals 126f to 126n of the flip-flops 91f to 91n of the comparator 24 are connected to signal inputs of the AND gate 245. The lamp 241g is connected to the reset output terminal 125n of the flip-flop 91n of the comparator 24 via an inverter 242g. The lamp 241h is connected to the set output terminal 126 n of the flip-flop 91n of the comparator 24 via an inverter 242h.

In the inverter of FIG. 26, when an input signal "1" is supplied to an input terminal 246, the transistor 247 is switched to its non-conductive condition and the lamp is deenergized. When an input signal "0" is supplied to the input terminal 246, the transistor 247 is switched to its conductive condition and the lamp is energized. The "1" signal may comprise a zero voltage and the "0" signal may comprise a negative voltage. It is thus seen that the lamps 241a, 241b, 241c, 241d and 241e of FIG. 25 will become energized when the flip-flops 91a, 91b, 91c, 91d and 91e of the comparator 24 are in their set or "1" conditions. This indicates the number or magnitude registered in the comparator 24.

The lamp 241f is energized when the flip-flops 91f to 91n of the comparator 24 are not all in their "0" or reset conditions. The lamp 241g is energized when the sign or polarity of the number registered in the comparator 24 is negative. The lamp 241h is energized when the sign or polarity of the number registered in the comparator 24 is positive.

Any suitable modification may be made in the operation of the control system of the present invention. Thus, for example, the motor 16R or 16L may be stopped when the number stored in the preset counter 26 is reduced to a predetermined magnitude, other than zero. The reference control unit 35 may be modified so that any desirable magnitude may be set therein. A pair of wheels may be regulated in diameter to maintain a desired difference in their diameters, rather than a zero difference.

While the invention has been described by means of specific examples and in a specific embodiment, we do not wish to be limited thereto, for obvious modifications will occur to those skilled in the art without departing from the spirit and scope of the invention.

We claim:
1. A control system for the comparatively regulation of the diameters of a pair of wheels, comprising
mounting means rotatably mounting first and second wheels, each of said wheels having a peripheral surface and a diameter;
first pulse producing means positioned in operative proximity with said first wheel for producing a first number of pulses corresponding to the diameter of said first wheel;
second pulse producing means positioned in operative proximity with said second wheel for producing a second number of pulses corresponding to the diameter of said second wheel;
comparator means connected to said first and second pulse producing means for producing an output corresponding to the difference between said first and second number of pulses, said output having a polarity determined by which of said first and second wheels has the larger diameter and comprising a number of pulses;
first grinding means for grinding the peripheral surface of said first wheel;
second grinding means for grinding the peripheral surface of said second wheel;
pulse generating means for producing pulses for energizing said grinding means; and
control means connected to said comparator means, said first and second grinding means and said pulse generating means for supplying pulses corresponding in number to the output of said comparator and produced by said pulse generating means to one of said first and second grinding means selected in accordance with the polarity of the output of said comparator.

2. A control system as claimed in claim 1, further comprising first gate means connected between said first pulse producing means and said comparator means, second gate means connected between said second pulse producing means and said comparator means, each of said first and second gate means having a conductive condition in which it transfers pulses and a non-conductive condition in which it blocks pulses, and gate control means connected to said gate means for switching said first and second gate means to their non-conductive condition after the transfer through one of said first and second gate means of a predetermined number of pulses thereby to block further transfer of pulses to said comparator means.

3. A control system as claimed in claim 1, wherein said comparator means comprises a reversible counter.

4. A control system as claimed in claim 1, wherein each of said first and second pulse producing means comprises a measuring roller having a peripheral surface in proximity with the peripheral surface of the corresponding wheel, said roller being adapted to be rotatably driven by said corresponding wheel, pulse generating means coupled to said roller for producing a number of pulses corresponding to the diameter of the corresponding wheel and pulse shaper connected between said pulse generating means and said comparator for shaping the pulses produced by said pulse generating means.

5. A control system as claimed in claim 1, wherein each of said first and second grinding means comprises a grindstone, support means for rotating and supporting said grindstone, motor means coupled to said support means for positioning said grindstone relative to the peripheral surface of the corresponding wheel and motor drive means connected between said control means and said motor means for energizing said motor means with the pulse produced by said pulse generating means.

6. A control system as claimed in claim 1, wherein said control means comprises a preset counter means connected to said comparator means, a first gate connected between said pulse generating means and said preset counter means and between said pulse generating means and said first grinding means, a second gate connected between said pulse generating means and said preset counter means and between said pulse generating means and said second grinding means, each of said first and second gates having a conductive condition in which it transfers pulses from said pulse generating means to the corresponding grinding means and to said preset counter means and a non-conductive condition in which it blocks pulses, and sign detector means connected to said preset counter means and to each of said first and second gates for controlling the conductive condition of each of said gates in accordance with the polarity of the output of said comparator by switching one of said first and second gates to its conductive condition when said polarity is as determined, said preset counter switching said one of said first and second gates to its non-conductive condition via said sign detector when a number of pulses equal to the number of pulses in the output of said comparator is transferred by said one of said first and second gates.

7. A control system as claimed in claim 1, further comprising indicator means connected to said comparator means for indicating the output of said comparator means.

8. A control system as claimed in claim 1, further comprising first gate means connected between said first pulse producing means and said comparator means, second gate means connected between said second pulse producing means and said comparator means, each of said first and second gate means having a conductive condition in which it transfers pulses and a non-conductive condition in which it blocks pulses, switching means and gate time control means connected to said switching means and to said gate means for maintaining said first and second gate means in their non-conductive condition for a determined period of time after actuation of said switching means and for switching said first and second gate means to their conductive condition after the expiration of said determined period of time.

9. A control system as claimed in claim 8, further comprising gate control means connected to said gate means for switching said first and second gate means to their non-conductive condition after the transfer through one of said first and second gate means of a predetermined number of pulses thereby to block further transfer of pulses to said comparator means.

10. A control system as claimed in claim 8, wherein each of said first and second pulse producing means comprises a measuring roller having a peripheral surface in proximity with the peripheral surface of the corresponding wheel, said roller being adapted to be rotatably driven by said corresponding wheel, pulse generating means coupled to said roller for producing a number of pulses corresponding to the diameter of the corresponding wheel and pulse shaper means connected between said pulse generating means and said comparator for shaping the pulses produced by said pulse generating means, and further comprising pressure means connected to said switching means and coupled to the measuring roller of each of said first and second pulse producing means for urging the peripheral surface of the measuring roller of each of said first and second pulse producing means into abutting contact with the peripheral surface of the corresponding wheel.

References Cited
UNITED STATES PATENTS

| | | | |
|---|---|---|---|
| 2,316,058 | 4/1943 | Flygare et al. | 51—104 X |
| 2,605,591 | 8/1952 | Hill | 51—104 |
| 3,281,995 | 11/1966 | Parella et al. | 51—165 |
| 3,321,869 | 5/1964 | Parella et al. | 51—49 X |

LESTER M. SWINGLE, *Primary Examiner.*

UNITED STATES PATENT OFFICE
CERTIFICATE OF CORRECTION

Patent No. 3,372,517                              March 12, 1968

Mitsugu Sakabe et al.

It is certified that error appears in the above identified patent and that said Letters Patent are hereby corrected as shown below:

In the heading to the printed specification, line 8, "Kaisha" should read -- Kisha --.

Signed and sealed this 30th day of September 1969.

(SEAL)
Attest:

Edward M. Fletcher, Jr.                        WILLIAM E. SCHUYLER, JR.
Attesting Officer                                   Commissioner of Patents